US009223630B2

(12) United States Patent
Song et al.

(10) Patent No.: US 9,223,630 B2
(45) Date of Patent: Dec. 29, 2015

(54) METHOD AND APPARATUS FOR ENERGY EFFICIENT DISTRIBUTED AND ELASTIC LOAD BALANCING

(75) Inventors: Haoyu Song, Edison, NJ (US); Fang Hao, Morganville, NJ (US); Tirunell V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 549 days.

(21) Appl. No.: 13/334,141

(22) Filed: Dec. 22, 2011

(65) Prior Publication Data

US 2013/0166943 A1 Jun. 27, 2013

(51) Int. Cl.
*G06F 9/46* (2006.01)
*G06F 9/50* (2006.01)

(52) U.S. Cl.
CPC .............. *G06F 9/505* (2013.01); *G06F 9/5083* (2013.01); *Y02B 60/142* (2013.01)

(58) Field of Classification Search
CPC ... G06F 9/5072; G06F 9/5083; G06F 9/4843; G06F 9/5077; G06F 9/466
See application file for complete search history.

(56) References Cited

U.S. PATENT DOCUMENTS

| 7,249,179 | B1 | 7/2007 | Romero et al. | |
|---|---|---|---|---|
| 2005/0022202 | A1 | 1/2005 | Sannapa Reddy et al. | |
| 2005/0114862 | A1* | 5/2005 | Bisdikian et al. | 718/105 |
| 2008/0140989 | A1 | 6/2008 | Dudau et al. | |
| 2010/0235654 | A1* | 9/2010 | Malik et al. | 713/300 |
| 2010/0262975 | A1* | 10/2010 | Reysa et al. | 718/105 |
| 2011/0047554 | A1* | 2/2011 | Lakshmanan et al. | 718/105 |
| 2011/0047555 | A1* | 2/2011 | Lakshmanan et al. | 718/105 |
| 2011/0126206 | A1* | 5/2011 | Kato et al. | 718/103 |
| 2011/0321041 | A1* | 12/2011 | Bhat et al. | 718/1 |
| 2013/0125097 | A1* | 5/2013 | Ebcioglu et al. | 717/136 |

FOREIGN PATENT DOCUMENTS

| JP | H07168790 A | 7/1995 |
|---|---|---|
| JP | 200330078 A | 1/2003 |
| JP | 2011118525 A | 6/2011 |
| WO | 2011107163 | 9/2011 |
| WO | PCT/US2012/065753 | 4/2013 |

OTHER PUBLICATIONS

Patent Abstracts of Japan, available at JPO, Publication No. 2003-030078, published Jan. 31, 2003, 1 page, corresponding to JP200330078A as cited in Foreign Patent Documents.
Patent Abstracts of Japan, available at JPO, Publication No. 07-168790, published Jul. 4, 1995, 1 page, corresponding to JPH07168790A as cited in Foreign Patent Documents.
Patent Abstracts of Japan, available at JPO, Publication no. 20111-118525, published Jun. 16, 2011, 1 page corresponding to JP2011118525A as cited in Foreign Patent Documents.

* cited by examiner

*Primary Examiner* — Dong Kim
(74) *Attorney, Agent, or Firm* — C. Bilicska

(57) ABSTRACT

Various embodiments provide a method and apparatus of providing a load balancing configuration that adapts to the overall load and scales the power consumption with the load to improve energy efficiency and scalability. The energy efficient distributed and elastic load balancing architecture includes a collection of multi-tiered servers organized as a tree structure. The handling of incoming service requests is distributed amongst a number of the servers. Each server in the virtual load distribution tree accepts handles incoming service requests based on its own load. Once a predetermined loading on the receiving server has been reached, the receiving server passes the incoming requests to one or more of its children servers.

10 Claims, 5 Drawing Sheets

METHOD AND APPARATUS FOR ENERGY EFFICIENT DISTRIBUTED AND ELASTIC LOAD BALANCING

TECHNICAL FIELD

The invention relates generally to methods and apparatus for providing server load balancing.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known load balancing systems, a service may be hosted on a number of servers in order to provide higher quality of service such as high throughput and low response time. A typical architecture may include a front-end load balancer and a fixed number of back-end servers. The front-end load balancer may be a dedicated hardware box which distributes the incoming requests to different servers using a conventional distribution policy such as: random, round robin, or load-based distribution. In this model, all of the server nodes are active and ready to serve the service requests.

In other known load balancing systems, a front-end load balancer sends new requests to the most loaded server as long as the server can satisfy the performance constraints in order to create more opportunity for servers to stay in low energy states. However, this solution is not scalable as tracking the load of a large number of heterogeneous servers requires a sophisticated and expensive front-end load balancer.

SUMMARY

Various embodiments provide a method and apparatus of providing a load balancing configuration that adapts to the overall load and scales the power consumption with the load to improve energy efficiency and scalability. The energy efficient distributed and elastic load balancing architecture includes a collection of multi-tiered servers organized as a tree structure. The handling of incoming service requests is distributed amongst a number of the servers. Each server in the virtual load distribution tree accepts incoming service requests based on its own load. Once a predetermined loading on the receiving server has been reached, the receiving server passes the incoming requests to one or more of its children servers.

In one embodiment, a method is provided for providing energy efficient and elastic load balancing at a parent server. The method includes: receiving a plurality of service requests instantiated by one or more clients, determining a plurality of service handling decisions based on the service requests, the plurality of service handling decisions corresponding to at least a portion of the plurality of service requests, selecting a child server based on a first of the service handling decisions and transmitting a first propagated service request based on a first service request, the first service request corresponding to the first service handling decision, and selecting the parent server based on a second of the service handling decisions and handling a second service request, the second service request corresponding to the second service handling decision.

In some embodiments, the act of handling the second service request includes responding directly to the instantiating client of the second service request.

In some embodiments, the method also includes: determining a parent load based on at least one of the plurality of service requests, the parent load indicating a loading of the parent server and waking at least one child server of the parent server based on the parent load and a server load threshold.

In some embodiments, the method further includes: determining a parent load based on at least one of the plurality of service requests, the parent load indicating a loading of the parent server, receiving a parent-parent load, the parent-parent load indicating a loading of a parent-parent server, wherein the parent-parent server is parent to the parent server, and switching operation of the parent server to a sleep mode based on the parent load, the parent-parent load and a parent-parent load threshold.

In some embodiments, the method further includes: registering the child server and at least one associated selection parameter, the at least one associated selection parameter being based on the first service request, selecting the child server based on a third service request of the plurality of service requests and the at least one registered associated selection parameters, and transmitting a third propagated service request based on a third service request.

In a second embodiment, an apparatus is provided for providing energy efficient and elastic load balancing at a parent server. The apparatus includes a data storage and a processor communicatively coupled to the data storage. The processor is configured to: receive a plurality of service requests instantiated by one or more clients, determine a plurality of service handling decisions based on the service requests, the plurality of service handling decisions corresponding to at least a portion of the plurality of service requests, select a child server based on a first of the service handling decisions and transmit a first propagated service request based on a first service request, the first service request corresponding to the first service handling decision, and select the parent server based on a second of the service handling decisions and handle a second service request, the second service request corresponding to the second service handling decision.

In some embodiments, handling of the second service request comprises further configuring the processor to: respond directly to the instantiating client of the second service request.

In some embodiments, the processor is further configured to: determine a parent load based on at least one of the plurality of service requests, the parent load indicating a loading of the parent server and wake at least one child server of the parent server based on the parent load and a server load threshold.

In some embodiments, the processor is further configured to: determine a parent load based on at least one of the plurality of service requests, the parent load indicating a loading of the parent server, receive a parent-parent load, the parent-parent load indicating a loading of a parent-parent server, wherein the parent-parent server is parent to the parent server, and switch operation of the parent server to a sleep mode based on the parent load, the parent-parent load and a parent-parent load threshold.

In some embodiments, 10 the processor is further configured to: register the child server and at least one associated selection parameter, the at least one associated selection parameter being based on the first service request, select the child server based on a third service request of the plurality of service requests and the at least one registered associated selection parameters, and transmit a third propagated service request based on a third service request.

In some embodiments, the selection of the child server is based on a proportion of a child server load of the child server and at least one other child server load corresponding to at least one other child server of the parent server.

In a third embodiment, a system if provided for providing energy efficient and elastic load balancing. The system includes a plurality of servers communicatively coupled through a network, the plurality of servers being logically arranged in a virtual load distribution tree, and a service request handler communicatively coupled to the plurality of servers. The service request handler configured to: receive a plurality of service requests instantiated by one or more clients, determine a plurality of service handling decisions based on the service requests, the plurality of service handling decisions corresponding to at least a portion of the plurality of service requests, select a child server based on a first of the service handling decisions and transmit a first propagated service request based on a first service request, the first service request corresponding to the first service handling decision, and select the parent server based on a second of the service handling decisions and handle a second service request, the second service request corresponding to the second service handling decision.

In some embodiments, the virtual load distribution tree comprises a root server and at least two levels of servers.

In some embodiments, the virtual load distribution tree is based on values of initial delay and energy saving potential for at least a portion of the plurality of servers.

In some embodiments, the virtual load distribution tree is based on a predicted system load.

In some embodiments, one or more of the plurality of servers are virtual machines.

In some embodiments, the system also includes: a service request manager communicatively coupled to the plurality of servers. The service request manager is configured to dynamically scale the virtual load distribution tree.

In some embodiments, 18 the service request manager is further configured to: recover a failed server; wherein the plurality of servers include the failed server; and wherein the recovery of the failed server includes at least one of: select a selected server to assume the role of the failed server, wherein the plurality of servers include the selected server; instantiate a new server to assume the role of the of the failed server, wherein the plurality of servers include the new server; and distribute the load of the failed server to one of more recovery servers, wherein the plurality of servers include the recovery servers.

In some embodiments, the system also includes a shared resource pool communicatively coupled to the service request manager.

In some embodiments, the service request manager dynamically allocates servers between the shared resource pool and the virtual load distribution tree based on load.

BRIEF DESCRIPTION OF THE DRAWINGS

Various embodiments are illustrated in the accompanying drawings, in which.

To facilitate understanding, identical reference numerals have been used to designate elements having substantially the same or similar structure and/or substantially the same or similar function.

DETAILED DESCRIPTION OF ILLUSTRATIVE EMBODIMENTS

Various embodiments provide a method and apparatus of providing a load balancing configuration that adapts to the overall load and scales the power consumption with the load to improve energy efficiency and scalability. The energy efficient distributed and elastic load balancing architecture includes a collection of multi-tiered servers organized as a tree structure. The handling of incoming service requests is distributed amongst a number of the servers. Each server in the virtual load distribution tree accepts incoming service requests based on its own load. Once a predetermined loading on the receiving server has been reached, the receiving server passes the incoming requests to one or more of its children servers.

Advantageously, this elastic load balancing architecture allows the system to compensate for fluctuating system loads. First, since a server does not pass incoming requests to its children servers until the server has reached a predetermined load, the children servers may be put to sleep during periods of low activity to reduce energy usage or reallocated to a shared resource pool. Second, this elastic load balancing architecture allows the system to assign children servers from a shared resource pool to servers during high load periods in order to reduce the instances of denial of services due to insufficient server capacity. Third, distributing the handling of incoming service requests amongst the servers eliminates the need for a sophisticated and expensive front-end load balancer.

Figure 1:
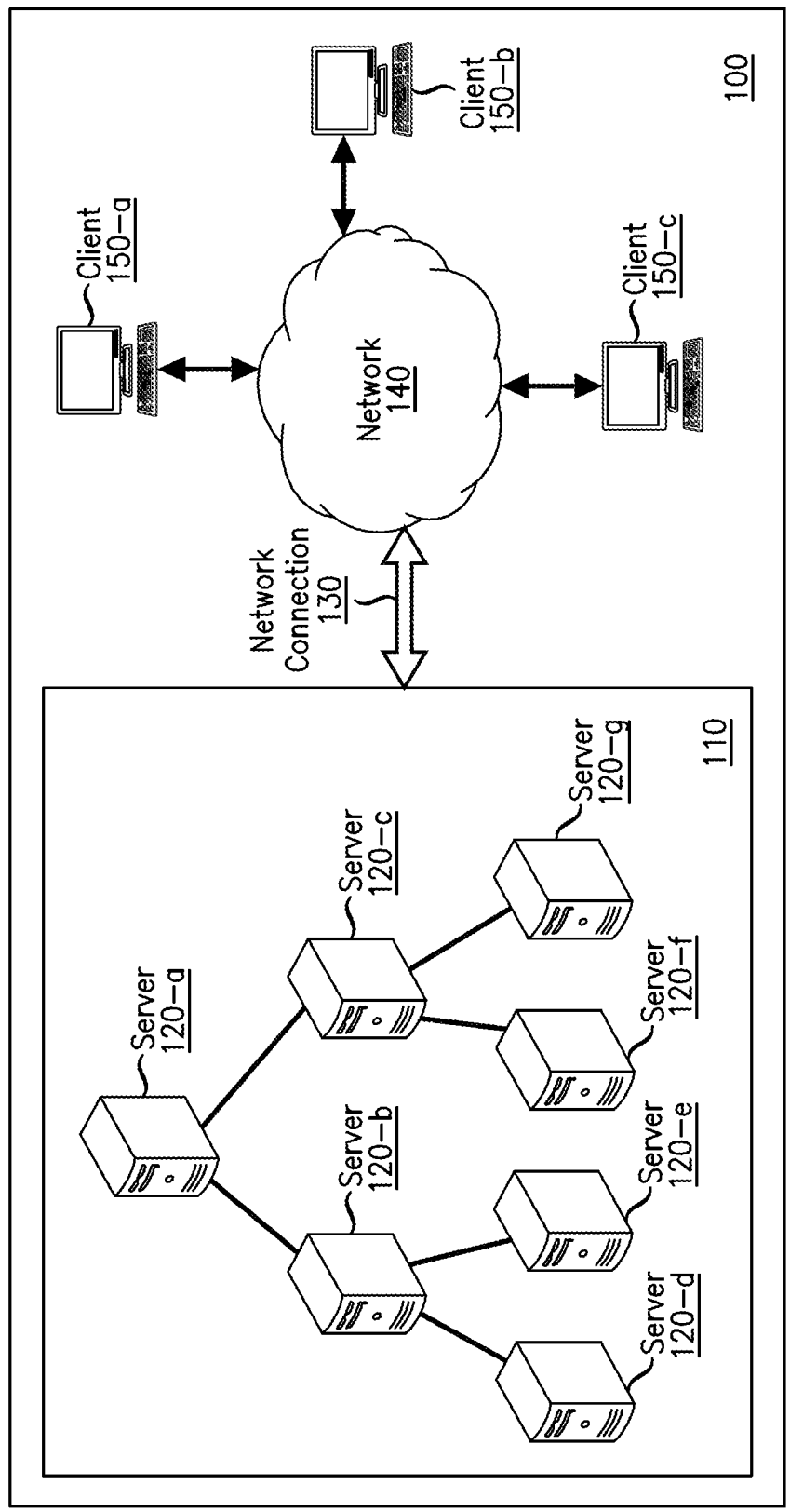
FIG. 1 illustrates a load balancing system 100 that includes an embodiment of the energy efficient distributed and elastic load balancing architecture 110.

FIG. 1 illustrates a load balancing system 100 that includes an embodiment of the energy efficient distributed and elastic load balancing architecture 110. An energy efficient distributed and elastic load balancing architecture 110 includes a collection of multi-tiered servers 120-a-120-g (collectively, servers 120). The servers 120 receive and respond to service requests from one or more clients 150-a-150-c (collectively, clients 150). Service requests from clients 150 are delivered to servers 120 over a network 140 via a network connection 130.

The servers 120 include the intelligence to route the client service request to the servers 120 that will handle the request as well as the resources and logic to respond to the client server request. The servers 120 are organized in a virtual load distribution tree with at least one parent server (e.g., server 120-a) and at least one child server (e.g., servers 120-b and 120-c are children servers of server 120-a). The architecture may have any number of tree levels and may vary the degree of the tree (i.e., the fan-out of the server) at each tree level. The tree may also be unbalanced. For example, some parent servers may have two children servers while others may have more or less than two children servers and/or some branches of the tree may have larger or smaller tree levels.

As defined herein, a root server is the server at the top level of the virtual load distribution tree (e.g., server 120-a), a parent server is a server that distributes service requests to at least one child server (e.g., servers 120-a, 120-b and 120-c), a child server is a server that receives service requests from a parent server (e.g., servers 120-b-120-g) and a leaf server is a server without any children servers (e.g., servers 120-d-120-g).

It should be appreciated that a server may be both a parent server and a child server. For example, server 120-b is a child server to server 120-a and a parent server to servers 12-d and 120-e. Moreover, it should be appreciated that a server may be both a leaf server and a child server.

The network connection 130 may support retrieving or responding to services requests over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); and the like. It should be appreciated that though depicted as a single connection, network connection 130 may be any number or combinations of communication channels supporting communication between servers 120 and the network 140.

The network 140 may be any suitable network for facilitating communication from servers 120 to clients 150. For example, network 140 may be any combination of: Local Area Network(s) (LAN), Wireless Local Area Network(s) (WLAN), Wide Area Network (WAN), Metropolitan Area Network (MAN), and the like.

The clients 150 may be type or number of client machine(s) initiating service request(s) directed to the energy efficient distributed and elastic load balancing architecture 110. For example, a client may be: a server, a mobile phone, a tablet, a computer, a personal digital assistant (PDA), an e-reader, a network device (e.g., a switch or a router) and/or the like.

In some embodiments, servers 120 are arranged in the virtual load distribution tree according to parameters such as the initial delay and the energy saving potential. The initial delay and energy saving potential of a particular virtual load distribution tree arrangement of servers 120 may be controlled based on a number of factors such as the arrangement of the virtual load distribution tree and individual server capabilities. In general for a virtual load distribution tree design of a number of servers "n", as the number of levels increase, routing service requests becomes less complex, energy efficiency increases, and the initial delay becomes larger. For example, for a number of servers "n", a flat tree with one root node and (n-1) leaf nodes has the minimum delay due to the request relay, but has the highest complexity and worst energy efficiency. On the other extreme, if the servers are organized as a chain, (i.e. a virtual load distribution tree with each tree level having a degree of 1), the tree is simple and energy efficient, but has maximum delay. Individual server capabilities may impact tree design if the servers 120 have different resource capabilities. In particular, servers may be placed in the virtual load distribution tree based on the capacity of service requests that they are capable of handling.

Figure 2:
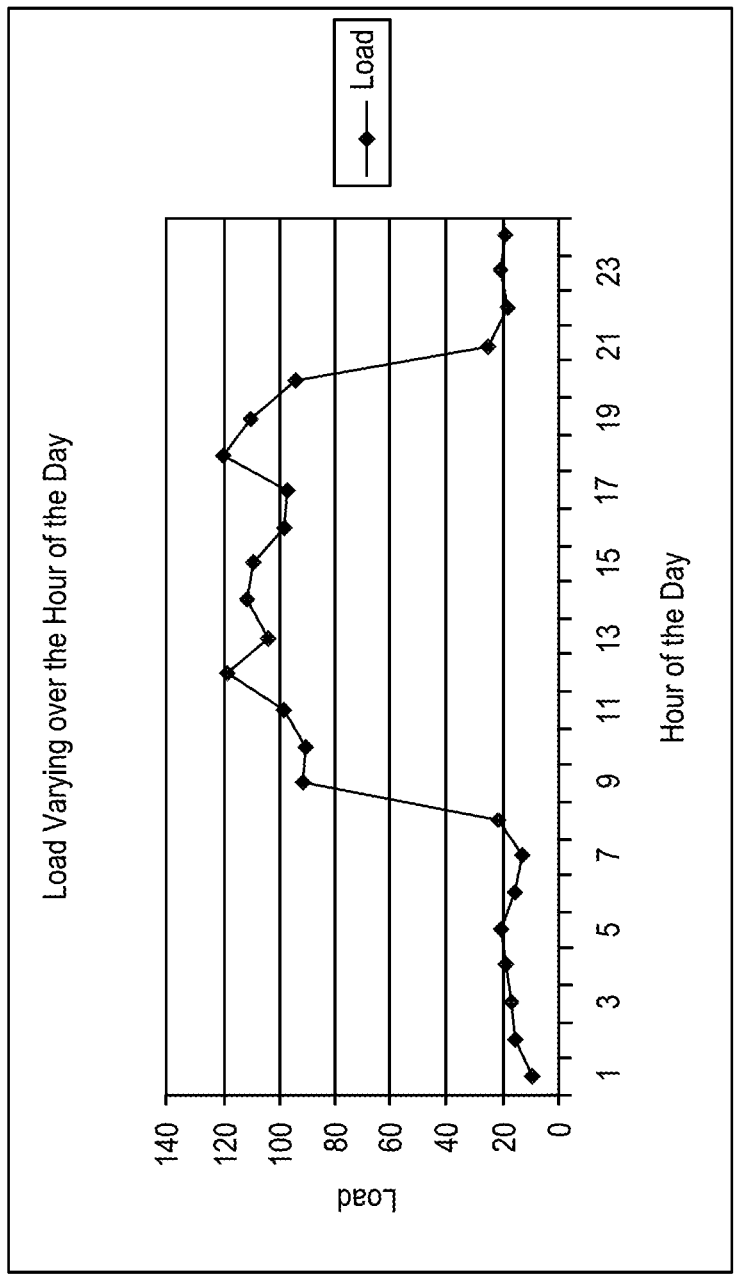
FIG. 2 illustrates an embodiment of the energy efficient distributed and elastic load balancing architecture 110 of FIG. 1.

In some embodiments, the virtual load distribution tree includes at least two levels below the root server. In a further embodiment, the degree of servers in a level of the virtual load distribution tree may be designed based on predicted loads. Referring to FIG. 2, an exemplary plot of the predicted load over the course of a day is shown. As can be seen, the load between 9:00 AM and 8:00 PM is predicted to be up to 120 while the load between 9:00 PM and 8:00 AM is predicted to be below 30. In this example, a virtual load distribution tree may be arranged such that the tree has two levels below the root server. The first level may be designed to handle loads under 30 while the second level may be designed to handle loads up to 120. This may be done by choosing individual servers with higher capacities for the second level of the virtual load distribution tree and/or using a higher degree (more servers) for the second level of the virtual load distribution tree.

In some embodiments, servers 120 may be homogenous and in other embodiments, servers 120 may be heterogeneous. It should be appreciated that by keeping the complexity of the servers low, special hardware may not be required.

In some embodiments, servers 120 may consist entirely of low-cost commodity servers to create a cost efficient system. It should be appreciated that since the intelligence to route the client service request to the servers 120 is distributed in a plurality of the servers 120, there is no need for a special hardware box to acting as a central load distributor.

In some embodiments, two or more servers 120 may be interconnected via a LAN. In some embodiments two or more servers 120 may be connected over a WAN such as the internet. It should be appreciated that each of servers 120 do not have to be connected in the same way or even via the same types of communication channels and/or protocols.

In some embodiments, two or more servers 120 may be virtual machines. In a further embodiment, a portion of the virtual machine servers may reside on the same physical hardware. In some embodiments, one or more virtual machine servers may include resource distributed over different hardware resources. In a further embodiment, at least a first portion of those hardware resources may be located in a different geographical location than at least a second portion of those hardware resources.

In some embodiments, the virtual load distribution tree may be scalable to dynamically grow or shrink, (i.e., add and delete servers) and/or modify the arrangement of the virtual load distribution tree based on load. Load determinations may be based on a system loading of the virtual load distribution tree and/or loading of one or more servers in the load distribution tree. For example, the load determination may be based on a branch of the virtual load distribution tree beginning with a parent server or based on loading of a single server in the virtual load distribution tree.

In a further embodiment, at least a portion of the servers dynamically added and deleted from the virtual load distribution tree may be added and deleted from a shared resource pool. A shared resource pool may be a collection of resources and/or servers that are shared amongst a number of applications/services. A separate shared resource pool manager may manage the allocation of resources/servers using conventional resource management methods. In a further embodiment, the resource pool manager is a hypervisor managing requests for cloud resources. The hypervisor may provide access to a collection of resources (e.g., a virtual machine) in response to a request from one of the servers 120.

In some embodiments, servers 120 are arranged in a virtual load distribution tree using an energy efficient distributed and elastic load balancing architecture 110 service request manager (not shown). The service request manager may reside on one or more of the servers 120, (e.g., the root server 120-a), and/or on one or more separate servers outside of servers 120. The service request manager may propagate virtual load distribution tree parameters to the servers 120 to create the relationships between servers.

Virtual load distribution tree parameters may include any suitable parameter such as: parameters to help specify when a server should handle a request, parameters to help specify when a server should transmit the request to one of its children servers, parameters to help specify when to spawn new children servers (e.g., in a scalable virtual load distribution tree), parameters to help specify when a child server in a low energy mode should be woken, and/or the like.

In some embodiments, the service request manager dynamically manages the virtual dynamic load tree. In particular, the service request manager may manage the scaling of the virtual load distribution tree as described herein or manage failure recovery of servers. For example, if one of servers 120 fails, that failed server may be excluded from the network. Furthermore, another server may be elected/instantiated to assume the role of the failed server or the load of the failed server may be distributed to the surviving servers. It should be appreciated that such architecture can avoid the link and node bottleneck and be resilient to network fault. It should also be appreciated that the service request manager may communicate with servers 120 over a conventional network (e.g., network 360).

Figure 4:
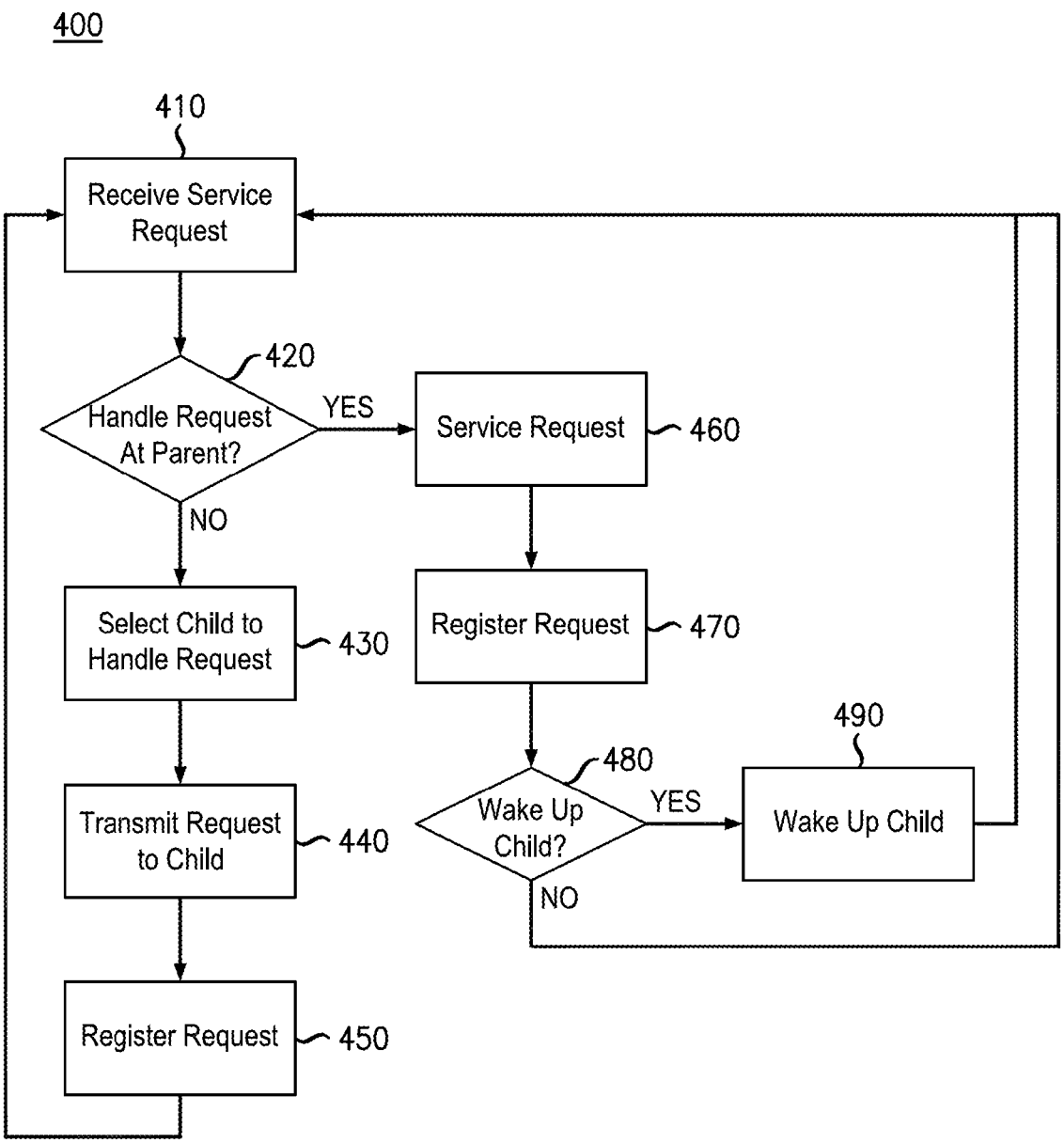
FIG. 4 depicts a flow chart illustrating an embodiment of a method for handling a service request using one of the servers 120 of FIG. 1.

FIG. 4 depicts a flow chart illustrating an embodiment of a method for handling a service request using one of the servers 120. Referring to FIG. 1, a server receives a service request either from a parent server or directly from one of the clients 150 (e.g., step 410 of method 400). If the receiving server determines that a child should handle the request (e.g., step 420 of method 400), the receiving server selects a child to handle the request (e.g., step 430 of method 400), transmits the request to the selected child (e.g., step 440 of method 400) and optionally registers the request in order to facilitate future requests (e.g., step 450 of method 400). If the receiving server determines it should handle the request itself (e.g., step 420 of method 400), the receiving server handles the request (e.g., step 460 of method 400), optionally registers the request in order to facilitate future requests (e.g., step 470 of method 400) and then optionally determines whether to wake up a child server in order to prepare the child server to handle a future service request (steps 480 and 490 of method 400).

In the method 400, the step 410 includes a receiving server receiving a service request either from a parent server or directly from one of the clients 150. Referring to FIG. 1, a service request from one of the clients 150 is initially received by the root server. The root server may then propagate the service request through the virtual load distribution tree based on a propagation determination. It should be appreciated that the root server and each parent server in the virtual load distribution tree receiving the propagated service request behave the same.

In the method 400, the step 420 includes determining whether the receiving server should propagate the service request to a child server or to handle the service request itself.

In the method 400, the step 430 includes selecting the child server to handle the service request. The child server may be selected using a conventional distribution policy, selected based on a previously registered selection, and/or selected based on a mapping of the requirements of the service request to the capabilities of the children servers.

In the method 400, the step 440 includes transmitting the request to the selected child server. It should be appreciated that the request propagated to the selected child server may be identical to the received request or may be modified by the receiving server.

The method 400 optionally includes step 450. Step 450 includes registering the request in order to facilitate future requests. In particular, for a service request that contains multiple consecutive packets, the packet flow of the selected server may be registered. It should be appreciated that in for some types of service requests, a particular server may be preferred or required to handle all the packets belonging to the same service request.

In the method 400, the step 460 includes handling the service request. For example, conventional network load balancing may distribute TCP/IP-based service requests, such as Web, terminal services, virtual private networking, and streaming media servers.

The method 400 optionally includes step 470. Step 470 includes registering the request in order to facilitate future requests as described above in step 450.

The method 400 optionally includes steps 480 and 490. Steps 480 and 490 include determining whether to wake up a child server in order to prepare the child server to handle a future service request. It should be appreciated that servers need to stay in power-off state or some other deep sleep modes in order to consume zero energy. Conventional techniques such as "wake-on-LAN" may be used to wake up a child server when a service request is being transmitted to the selected server (e.g., step 440); however, waking a server often takes some extended period of time and during this transition period, service requests may not be deliverable. As such the parent server may include step 480 to proactively wake one or more child servers. In particular, a server may determine to proactively wake a child server based on the parent server's load and/or a historical prediction of future load (e.g., FIG. 2 and the accompanying description). Advantageously, proactively waking up one of more child servers may help the parent server avoid overflow conditions.

In some embodiments of the method 400, step 420 includes determining that the receiving server has reached its capacity and can no longer handle further requests. In other embodiments, step 420 includes determining that the receiving server has reached some predetermined load or percentage or load.

In some embodiments of the method 400, step 430 includes using a distribution policy such as: random, round robin, or load-based distribution. In some embodiments of the method 400, step 430 includes selecting the most loaded child that is capable of satisfying the performance constraints in order to create more opportunity for servers to stay in low energy states. In some embodiments of the method 400, step 430 includes selecting child servers proportional to the load capability of each child.

In some embodiments of the method 400, step 430 includes selecting a child server based on a mapping of the capabilities of the child server and the requirements of the service request. For example, a first child server of the parent server may be configured to handle streaming media requests more efficiently than a second child server.

In some embodiments of the method 400, step 430 includes selecting a child server based on the client (e.g., clients 150 of FIG. 1) instantiating the service request. For example, in some configurations, one or more servers (e.g., servers 120 of FIG. 1) may be dedicated to one or more of the clients.

In some embodiments of the method 400, step 450 and/or 470 includes registering the packet flow with the root server so that subsequent packets may be directly delivered to the selected server. Advantageously, by registering the packet flow, delays and selection errors may be lowered.

In some response embodiments of the method 400, step 460 includes replying directly to the requesting client (e.g., client 150-*a* in FIG. 1).

In a first embodiment of these response embodiments, the destination address is modified in the response. Advantageously, by modifying the destination address to that of the responding server, the requesting client is capable of directing future packets directly to the responding server without following the virtual load distribution tree path.

In a second embodiment of these response embodiments, the destination address of the service request is not modified in the response to the requesting client. Advantageously, by responding with the unmodified destination address, future service requests will still be directed to the root server. In a further embodiment, the servers 120 each contain a unique primary address and a secondary virtual address that is shared amongst the servers 120 in the virtual load distribution tree.

Figure 3:
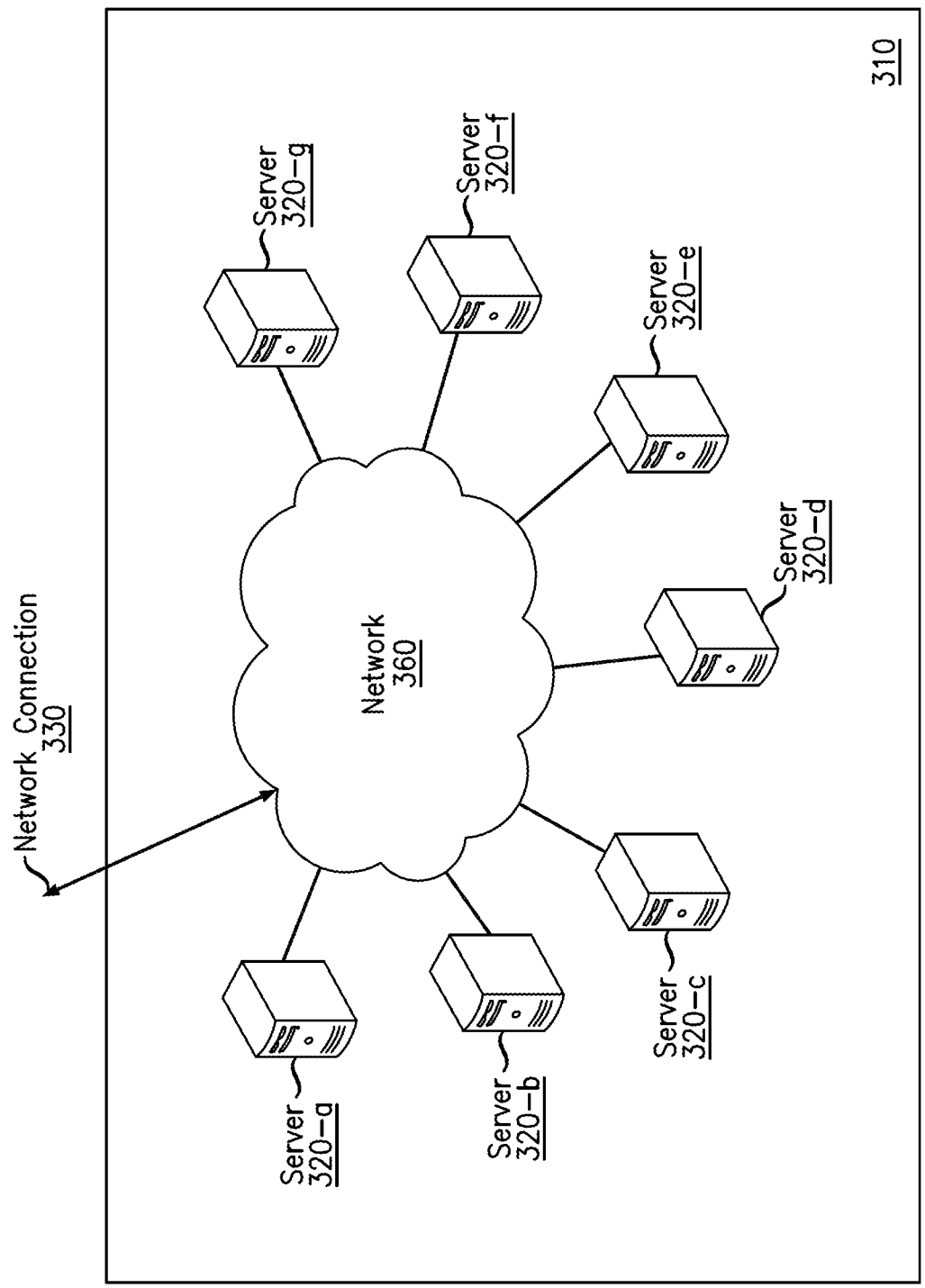
FIG. 3 depicts a flow chart illustrating an embodiment of a method for providing primary-backup services using the backup-in-the-middle forwarder 120 of FIG. 1.

In some embodiments of the method 400, the method may further include determining to turn the parent server to sleep mode. In a further embodiment, the parent server may determine to enter sleep mode based on its loading and the loading of the server's parent. In particular, when a server has no scheduled jobs (e.g., service request tasks) and the server's parent server has a load below a threshold level, the server enters in an energy efficient sleep mode. It should be appreciated that parent and children servers may communicate loading parameters via conventional communication protocols and connections over a conventional network (e.g., network 360 of FIG. 3).

After steps 450 and 490, method 400 returns to step 410 to repeat the process of receiving and processing service requests.

Although primarily depicted and described in a particular sequence, it should be appreciated that the steps shown in method 400 may be performed in any suitable sequence. Moreover, the steps identified by one box may also be performed in more than one place in the sequence.

For example, optional steps 480 and 490 may be performed at any point in the process. Moreover, they may even be performed outside of the process before a service request has been received.

In some embodiments the energy efficient distributed and elastic load balancing architecture 110 of FIG. 1, one or more of the servers 120 includes a service request handler that performs the steps of method 400. In a further embodiment, each of the servers 120 includes a service request handler. It may be appreciated that the service request handler may reside on one or more of the servers 120, (e.g., each of servers 120), and/or on one or more separate servers outside of servers 120

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 5:
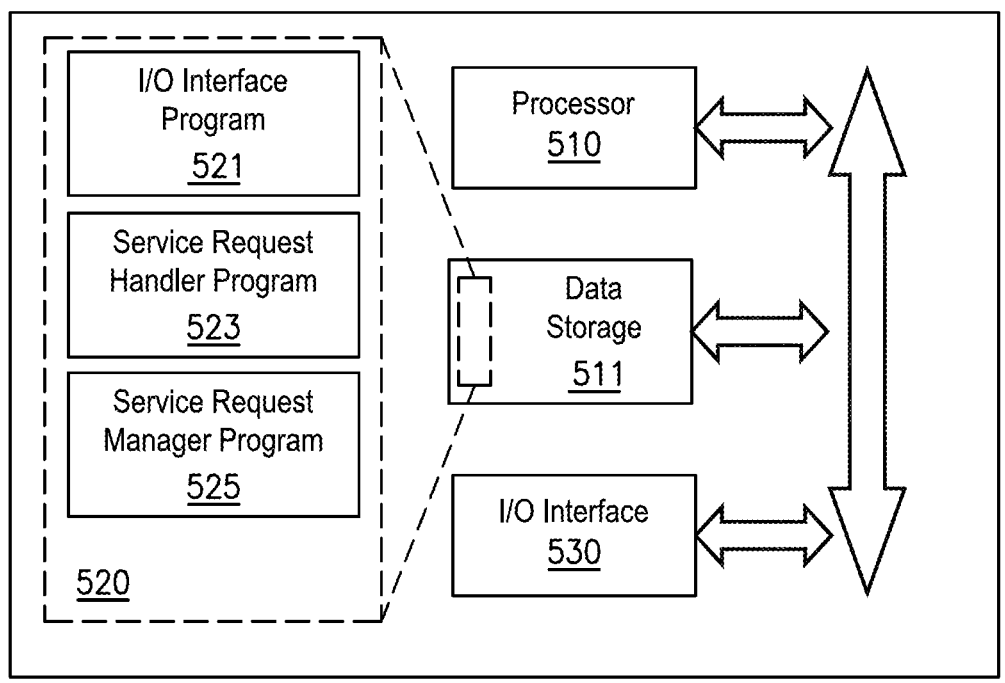
FIG. 5 schematically illustrates blocks of one embodiment of one of the servers 120 of FIG. 1.

FIG. 5 schematically illustrates one embodiment of one of the servers 120 of FIG. 1. The server 120 may perform the functions described herein, e.g., using the method 400. The server 120 includes a processor 510, a data storage 511, and an I/O interface 530.

The processor 510 controls the operation of the server 120. The processor 510 cooperates with the data storage 511.

The data storage 511 may store the loading parameters (e.g., steps 420, 430, 450, 470 and 480 in FIG. 4) and buffer the received and transmitted service requests and inter server communication (e.g., steps 410, 440, 450, 460 and 470 in FIG. 4). The data storage 511 also stores programs 520 executable by the processor 510.

The processor-executable programs 510 may include an I/O interface program 521, a service request handler program 523 and/or a service request manager program 525. Processor 510 cooperates with processor-executable programs 520 to implement the functionality described in FIGS. 1-4 and/or perform the steps of method 400.

The I/O interface 530 is configured for supporting any suitable number of channels supporting any suitable number(s) of sessions (e.g., any suitable number of IP flows), which may be directed between the particular server 120 and one or more clients (e.g., client 150-*a*-150-*c* in FIG. 1) and one or more of the servers (e.g., servers 120 in FIG. 1). I/O interface 530 may support any suitable type(s) of communication paths and communication protocols. For example, communication paths may include wireless communications (e.g., GSM and CDMA); wireline communications; packet network communications (e.g., IP); broadband communications (e.g., DSL); and the like, as well as various combinations thereof.

In some embodiments, the server 120 is a special designed network interface card (NIC). In a further embodiment, the NIC provides service request handling. Advantageously, since the NIC handles the incoming service requests, the server host can focus on its core functions and dedicate its resource to provide the service. It should be appreciated that the server host may provide indications of load and other suitable parameters to the NIC.

In some embodiments, the host server may set a busy bit on the NIC to indicate that the host is busy and can no longer accept new requests. In this embodiment, the NIC may automatically forward the new service requests to proper servers based on the virtual load distribution tree. Advantageously, this NIC hardware acceleration can further reduce the service delay.

When processor-executable programs 520 are implemented on a processor 510, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for providing energy efficient and elastic load balancing at a parent server, comprising:
   at a processor communicatively coupled to a data storage, receiving a plurality of service requests instantiated by one or more clients;
   determining, by the processor in cooperation with the data storage, a plurality of service handling decisions based on the service requests, a plurality of determined delays between the parent server and a plurality of child servers, and a determined energy savings potential of the parent and the plurality of child servers, the plurality of service handling decisions corresponding to at least a portion of the plurality of service requests, wherein the parent server and the plurality of child servers are arranged in a virtual load distribution tree based on a plurality of initial determined delays between the parent server and the plurality of child servers and an initial determined energy savings potential of the parent and the plurality of child servers;
   selecting, by the processor in cooperation with the data storage, a child server of the plurality of child servers based on a first of the service handling decisions and transmitting a first propagated service request based on a first service request, the first service request corresponding to the first service handling decision;
   selecting, by the processor in cooperation with the data storage, the parent server based on a second of the service handling decisions and handling a second service request, the second service request corresponding to the second service handling decision;
   determining, by the processor in cooperation with the data storage, a parent load based on the second service request, the parent load indicating a loading of the parent server; and
   proactively waking, by the processor in cooperation with the data storage and associated with processing the second service request, a second child server of the plurality of child servers based on the parent load and a server load threshold, wherein the proactively awakened child server does not need to service the second service request.

2. The method of claim 1, wherein the act of handling the second service request comprises: responding directly to the instantiating client of the second service request.

3. The method of claim 1, further comprising:
   determining, by the processor in cooperation with the data storage, parent load based on at least one of the plurality of service requests, the parent load indicating a loading of the parent server;
   receiving, by the processor in cooperation with the data storage, a parent-parent load, the parent-parent load indicating a loading of a parent-parent server, wherein the parent-parent server is parent to the parent server; and
   switching, by the processor in cooperation with the data storage, operation of the parent server to a sleep mode based on the parent load, the parent-parent load and a parent-parent load threshold.

4. The method of claim 1, further comprising:
   registering, by the processor in cooperation with the data storage, the child server and at least one associated selection parameter, the at least one associated selection parameter being based on the first service request;
   selecting, by the processor in cooperation with the data storage, the child server based on a third service request of the plurality of service requests and the at least one registered associated selection parameters; and
   transmitting a third propagated service request based on a third service request.

5. The method of claim 1, wherein selection of the child server is further based on the child server of the plurality of child servers having the highest load of the plurality of child servers that is capable of satisfying one or more performance constraints.

6. An energy efficient and elastic load balancing apparatus, comprising:
   a data storage; and
   a processor communicatively coupled to the data storage, the processor configured to:
   receive a plurality of service requests instantiated by one or more clients;
   determine a plurality of service handling decisions based on the service requests, a plurality of determined delays between the parent server and a plurality of child servers, and a determined energy savings potential of the parent and the plurality of child servers, the plurality of service handling decisions corresponding to at least a portion of the plurality of service requests, wherein the parent server and the plurality of child servers are arranged in a virtual load distribution tree based on a plurality of initial determined delays between the parent server and the plurality of child servers and an initial determined energy savings potential of the parent and the plurality of child servers;
   select a child server of the plurality of child servers based on a first of the service handling decisions and transmit a first propagated service request based on a first service request, the first service request corresponding to the first service handling decision;
   select the parent server based on a second of the service handling decisions and handle a second service request, the second service request corresponding to the second service handling decision;

determine a parent load based on the second service request, the parent load indicating a loading of the parent server; and proactively waking a second child server of the plurality of child servers based on the parent load and a server load threshold, wherein the proactively awakened second child server does not need to service the second service request.

7. The apparatus of claim 6, wherein handling of the second service request comprises further configuring the processor to: respond directly to an instantiating client of the second service request.

8. The apparatus of claim 6, wherein the processor is further configured to:

determine the parent load based on at least one of the plurality of service requests, the parent load indicating a loading of the parent server;

receive a parent-parent load, the parent-parent load indicating a loading of a parent-parent server, wherein the parent-parent server is parent to the parent server; and switch operation of the parent server to a sleep mode based on the parent load, the parent-parent load and a parent-parent load threshold.

9. The apparatus of claim 6, wherein the processor is further configured to:

register the child server and at least one associated selection parameter, the at least one associated selection parameter being based on the first service request;

select the child server based on a third service request of the plurality of service requests and the at least one registered associated selection parameters; and transmit a third propagated service request based on a third service request.

10. The apparatus of claim 6, wherein the selection of the child server is based on a proportion of a child server load of the child server and at least one other child server load corresponding to at least one other child server of the parent server.

* * * * *